Patented Jan. 6, 1942

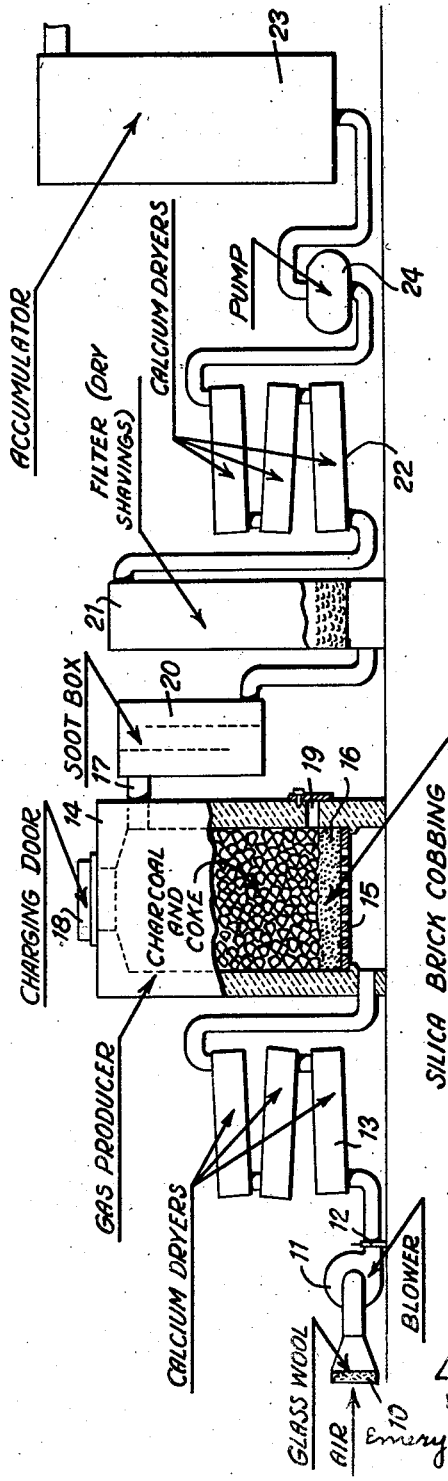

2,269,392

UNITED STATES PATENT OFFICE 2,269,392

PROCESS AND APPARATUS FOR MAKING GAS

Luther W. Bahney, Elizabeth, N. J., assignor to Scovill Manufacturing Company, Waterbury, Conn., a corporation of Connecticut Application May 16, 1939, Serial No. 273,895

5 Claims. (Cl. 252—373)

This invention relates to a method of and apparatus for producing a gas suitable for protecting hot or molten metals of certain types for refining, treating, casting or annealing processes, and for other industrial purposes, and has for an object the provision of improvements in this art. The invention concerns the production of a gas composed largely of carbon monoxide (CO) and nitrogen ($N_2$) and relatively small amounts of carbon dioxide ($CO_2$) by the operation of a "dry air" gas producer. The invention has been developed in connection with the production of a gas suitable for protecting molten oxygen-free copper prepared by the "Summey" process and will be principally considered from this point of view but without any intention of limiting the field of the invention thereby. The invention provides for the production of a uniform supply of a gas of constant composition and the continuous operation of the producer over much longer periods than have heretofore been possible. It also minimizes the attention required for the operation of the producer, thus reducing labor costs, and permits the use of a less expensive fuel, thus reducing the cost of material.

In the patent of David L. Summey, No. 2,060,133, there is disclosed a process for protecting molten copper and other metals of high purity by a special gas which inhibits the existence of metallic oxides and gas cavities in the metal upon solidification. This was a gas composed predominantly as to active constituent of carbon monoxide, having harmless amounts of carbon dioxide, and the balance principally nitrogen. Such a gas, being deoxidizing in character, gave positive assurance that the previously deoxidized metal would not be reoxidized.

In the patent of Luther W. Bahney, No. 2,060,137, this gas was more specifically described as to permissible limits as containing over 10% carbon monoxide and under 15% carbon dioxide, preferably 20% or more of carbon monoxide and 5% or less carbon dioxide. This gas could be obtained from a dry air gas producer operating at about 910° C. with a pure grade of wood charcoal. If the gas contained too much carbon dioxide, hydrogen or water, the resulting copper castings were unsound. The presence of excessive amounts of carbon dioxide was avoided by maintaining a deep bed of glowing charcoal in the producer and limiting the amount of air supplied to it. Hydrogen and water were substantially eliminated by drying the incoming air before it entered the producer and passing the gas over a drying agent before passing it to the metal enclosures.

The gas generated from charcoal was satisfactory as to composition when operating conditions of the producer were carefully maintained but these conditions could be maintained only by constant attention. For example, the charcoal was carefully selected to avoid green pieces which would produce undue amounts of moisture and hydrogen. The charcoal was carefully sized to obtain only small pieces and dried by heating before use. These requirements and preparatory steps made the fuel quite expensive.

But even so, there were certain further difficulties in the generation of the gas. The hottest part of the fuel bed was at the bottom of the producer where the air entered and this rapidly burned out the grates. When a fireproof bottom, as for example, a cobbing of broken silica brick 8 or 9 inches thick was installed, the grate was preserved but the fine ash produced by the burned charcoal soon filled up the passages through the fuel bed to such an extent as to interefere with the travel of air therethrough and thereby injuriously affected the quantity and composition of the gas produced unless the fuel bed was frequently agitated. For the purposes for which a gas of this character is used it is highly desirable to obtain a supply which is as uniform in quantity and composition as possible.

Furthermore, the gas generated from charcoal alone contained fine filaments of carbonaceous character which partially obstructed the carefully calibrated pouring openings and produced troublesome casting conditions. These filaments were encountered in spite of careful cleaning of the gas and were different from ordinary soot which could readily be removed by the normal after-treatment of the gas by passage through soot boxes, filters, scrubbers and the like.

The desired gas can also be generated from coke. This is less expensive and more easily obtained than the desired grade of charcoal and besides avoids the fine ash, soot and carbonaceous filaments encountered with charcoal. With coke it is easy to keep the air flowing through the fuel bed except when clinkers form.

But when coke alone is used in a dry air gas producer, clinkers are formed which within a day or two obstruct the inflow of air, resulting in a non-uniform supply and composition of gas. The clinkers are difficult to remove even if a fireproof cobbing is employed, requiring frequent shifts to another producer while the obstructed producer is shut down for cleaning. If the coke is burned directly on a metal grate the clinker forms to such an extent in a few hours as to seriously obstruct the flow of air. The clinker may be more readily removed from grates than from the fireproof cobbing but constant attention is required to keep the grates free of clinkers, and besides the grates burn out and require the producer to be shut down.

The clinkering difficulties encountered with dry air gas producers which are required for generating a protective gas of the desired type are not encountered with other types of gas generators which produce the more common form of gas having a high heating value. Heating gases may be generated by passing a continuous mixture of air and steam through a bed of fuel; or air and steam may be passed intermittently through the fuel bed. The use of steam in such generators minimizes the formation of clinkers.

According to the present invention the objectionable characteristics of charcoal and coke, when either is used alone are eliminated and the good qualities of both are combined by using a mixture of the two. When thus used, and particularly when the preferred proportions are used, it is possible to use the fireproof silica brick cobbing and keep it and the fuel bed clear without undue labor and without shutting down the producer frequently. Indeed it has been found that a plant operated in accordance with the present invention may be operated without shut-down for a month or two instead of a day or two as formerly. In this way a continuous supply of gas of uniform character is produced. By drying the air before it is lead to the producer, by pre-drying the fuel, by filtering, scrubbing and otherwise cleaning the gas, and by drying the gas, a final product is obtained which is highly desirable for the intended purposes.

As the gas has heretofore been used in producing oxygen-free copper castings according to the Summey process there is a heavy periodic demand when the molds are being flushed and thereafter a smaller demand while the molds are being filled with metal. This may cause some variation in the composition of the gas because of the varying amounts of air passing through the fuel bed and the consequent changes in temperature. While this has not rendered the gas unsuitable for this use it might be unsuitable for some other purposes. For most purposes it is preferable to maintain a reserve supply of gas to take care of fluctuations in consumption without entailing sudden and heavy fluctuations in production.

It is well known that the greater the amount of air supplied, the less will be the carbon monoxide generated and the more will be the carbon dioxide generated; also that the colder the fuel bed, the less will be the percentage of carbon monoxide and the greater the percentage of carbon dioxide. By using an accumulator in the gas line and cleaning the gas as much as is necessary for operating a gas pump, it is possible to take care of the widely fluctuating demands, maintain a generally constant pressure, and at the same time maintain a gas of more uniform character because of the more uniform flow of air to and gas from the producer.

The invention will best be understood by reference to an exemplary embodiment thereof explained in connection with the accompanying drawing, wherein the single figure is a schematic view of a preferred form of apparatus for producing the desired gas.

In this apparatus air is drawn through a filter 10 of glass wool matting several inches thick to remove dust particles. The air is drawn in by a suction blower 11 and the flow is controlled by a valve 12. The incoming air is dried in any suitable manner as by passing it over a number of trays 13 containing granular calcium chloride. When the atmospheric air is naturally quite dry it may not be necessary for all purposes to remove moisture but preferably the drying equipment is kept in service at all times to remove moisture if necessary in order to maintain approximate dry atmospheric conditions continuously. This avoids the attention which would otherwise be required to make test determinations of the moisture content of the air for the purpose of learning when it is necessary to operate the dryer. In very damp weather which prevails usually in the warmer seasons of the year there is a considerable amount of moisture removed by the dryer; while in naturally dry weather very little, if any, moisture is removed.

The dried air is led to the bottom of a gas producer 14 provided with an open metal grate 15 upon which is placed a broken silica brick cobbing 16 which is 8 or 9 inches deep. The producer is relatively long in comparison to its diameter so as to maintain a deep bed of glowing fuel through which the air is required to pass to reach the gas outlet 17 on the side near the top. For example, the fuel bed may be 6 feet deep and 2 to 2½ feet in diameter. Fuel may be charged and the bed stirred through a top opening normally closed by a cover 18. A side opening 19 just above the brick cobbing is provided for cleaning when necessary.

As stated above, the fuel preferably consists of a mixture of pre-heated and dried charcoal and coke. The charcoal should be free from green pieces which would produce hydrogen, moisture, acids and the like, and free from fines or dust. It should also be well charred. Hardwood charcoal is preferred. To assist in assuring the proper type of fuel in sizes most suitable for use in the producer the specifications may require that it shall pass a 2 inch square mesh screen and be retained on a 1 inch mesh screen.

Even small amounts of charcoal with coke will reduce clinkering encountered with coke alone; and small amounts of coke with charcoal will reduce the troubles encountered with charcoal alone. The relative amounts of coke and charcoal used for best results are determined by volumetric measurement, that is a certain amount of coke is measured and mixed with a certain amount of charcoal which has been separately measured. It should be understood that the volumes and percentages hereinafter mentioned are thus independently determined for both coke and charcoal before the two are mixed together. Noticeably improved results are realized when the amount of coke by volume is equal to or greater than the amount of charcoal by volume, on the one hand; and when the amount of charcoal is equal to one-ninth or more of the amount of coke by volume, on the other hand. This may be expressed as a range of between one part of coke to one part of charcoal up to nine parts of coke to one part of charcoal by volume; or referring to the sum of the volumes of the two fuels, as 50% to 90% coke and 50% to 10% charcoal. Having regard to cost and best results in gas production I have found that a mixture of about 3 parts of coke and 1 part charcoal by volume, i. e., 75% and 25% respectively of the sum of the two volumes, is very satisfactory.

From the producer the gas goes to a soot box 20 where its flow is slowed down by increased space and baffles to remove soot and dust. Next it is passed up through a filter 21 containing suitable material such as dry shavings to remove tarry constituents, means being provided for readily substituting fresh shavings for the old when the charge becomes too much filled with tar to be effective. As many filters as necessary may be used, and if desired wet scrubbers may also be used to remove more completely soot, dust, tar and water soluble substances from the gas.

The gas is passed through a dryer 22 to remove moisture taken up from the fuel, that not removed in drying the air, and that taken up from the wet scrubbers, if used. The dryers may be of any suitable type, preferably trays of granular calcium chloride over which the gas passes.

For maintaining a uniform supply of gas at a steady pressure and for permitting a regular flow of air into the producer and gas therefrom, an accumulator 23 served by a pump 24 may be employed.

A gas producing plant constructed and operated in accordance with the present invention may be operated for weeks at a time without interruption, whereas previously it was necessary to shut down or change to another producer every day or two in order to obtain a continuous supply of gas of uniform character.

In order to indicate the character of the gas which this plant is adapted to produce, several analyses taken over a considerable period of time indicated a range of gas constituents as follows:

Carbon monoxide (CO)
per cent by volume__ 20 to 30
Carbon dioxide ($CO_2$) _____do____ 1 to 6
Nitrogen ($N_2$) _____do____ 57 to 77
Hydrogen ($H_2$) _____do____ 2 to 7
Water ($H_2O$) __grains per cubic foot__ 1.3 to 10.3
Oxygen ($O_2$) _____ None These analyses represent safe working conditions and not necessarily the outer limits which are permissible, even for a gas suitable for protecting oxygen-free copper. The Bahney patent, referred to above, gives an idea of the permissible limits in gas composition for this purpose. Some of the desirable characteristics of the gas which is produced by the present process for the purpose of protecting oxygen-free copper are, that it will be positively reducing in character; that it will readily ignite and burn with a visible bluish flame; that no cloudiness will be produced in the pouring hood; that the percentage of inert gas, like nitrogen will be sufficient to make the gas non-explosive; and that the castings produced will be of high density as evidenced by a deep shrink cavity. The gas is kept as nearly free from hydrogen and moisture as conditions require, the amounts of these objectionable constituents which are permissible in the protecting gas being somewhat dependent upon the relative amounts of other constituents which are present, a subject which need not be investigated in the present application which relates to the uniform production of a gas of permissibly variable constituents. That is to say, the character of the gas may be varied to suit conditions but once a certain composition has been selected the output may be kept uniformly to this composition.

Neither do the analyses represent any attempt to maintain an exact gas composition for a given run. The gas for a given run may be maintained within a very narrow range of composition limits, although at different times and for different purposes the gas composition may vary over a wide range. This close control is possible because an open fuel bed of uniform character can be maintained by following the teachings of the present invention.

It will thus be seen that the invention provides a relatively simple process and dependable apparatus for producing a gas of the desired character. The process is such that the apparatus can be kept in satisfactory and continuous operation for long periods of time with minimum attention, which makes the resultant gas more satisfactory and relatively less expensive than has been possible by previous methods and equipment.

While one embodiment of the invention has been particularly described, it is to be understood that the invention may have various embodiments within the limits of the prior art and the scope of the subjoined claims.

I claim as my invention:

1. The method of making a dry producer gas which is composed principally of carbon monoxide and nitrogen and which is non-oxidizing in character, which comprises, maintaining a deep glowing bed of fuel composed of a volumetric mixture of 50% to 90% dry coke and 50% to 10% dry charcoal upon an openwork support in a gas producer, and passing air through the support and fuel bed to generate the gas.

2. The method of making a dry producer gas which is composed principally of carbon monoxide and nitrogen and which is non-oxidizing in character, which comprises, maintaining a deep glowing bed of fuel composed of a volumetric mixture of 50% to 90% dry coke and 50% to 10% dry charcoal upon an openwork refractory cobbing support in a gas producer, passing air through the support and fuel bed to generate the gas, and removing suspended matter such as ash and tarry constituents from the gas before use.

3. The method of making a dry producer gas which is composed principally of carbon monoxide and nitrogen and which is non-oxidizing in character, which comprises, maintaining a deep glowing bed of fuel composed of a volumetric mixture of 50% to 90% dry coke and 50% to 10% dry charcoal upon an openwork refractory cobbing support in a gas producer, passing air through a dryer, the support, and the fuel bed to generate the gas, and passing the gas through a dryer and a filter before use.

4. The method of making a dry producer gas composed principally of carbon monoxide and nitrogen and containing relatively small amounts of carbon dioxide, which is approximately of uniform composition, and which is approximately free of ash, moisture, tarry substances and carbonaceous filaments, while keeping the fuel bed and its support free from clinkers and ashes, which comprises, maintaining a deep glowing bed of fuel composed of a mixture of dry coke and dry charcoal upon an openwork refractory cobbing support in a gas producer, the amount of coke in the mixture being sufficient to prevent ash obstruction of the support and the production of carbonaceous filaments in the gas and the amount of charcoal being sufficient to prevent rapid formation of clinkers, passing relatively dry air through the support and the fuel bed to generate the gas, and removing tarry constituents from the gas before use.

5. The method of producing a non-oxidizing dry air producer gas composed principally of carbon monoxide and nitrogen and containing relatively small amounts of carbon dioxide of approximately uniform composition and amount while keeping the fuel bed open and free from clinkers and ashes, which comprises the following steps in combination: drying a supply of coke and charcoal fuel by heating it, selecting the pieces of fuel to pass a 2 inch mesh screen and be retained on a 1 inch mesh screen, drying a supply of air by passing it over enclosed trays containing calcium chloride, maintaining a deep bed of glowing fuel composed of an intimate mixture of coke and charcoal on a cobbing of broken silica brick, passing controlled amounts of dried air upward through the fuel bed, removing tarry constituents from the gas, drying the resulting gas by passing it over enclosed trays containing calcium chloride, and storing a supply of the gas to permit a relatively even flow of gas through the producer.

LUTHER W. BAHNEY.